(12) United States Patent
Iwase et al.

(10) Patent No.: US 9,140,311 B2
(45) Date of Patent: Sep. 22, 2015

(54) VEHICLE DRIVING APPARATUS

(75) Inventors: Mikio Iwase, Anjyo (JP); Tomohide Suzuki, Kariya (JP); Naoya Jinnai, Anjyo (JP); Tatsuya Okishima, Chirya (JP); Toshihiko Kamiya, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/522,135

(22) PCT Filed: Mar. 4, 2011

(86) PCT No.: PCT/JP2011/055720
§ 371 (c)(1),
(2), (4) Date: Jul. 13, 2012

(87) PCT Pub. No.: WO2011/108769
PCT Pub. Date: Sep. 9, 2011

(65) Prior Publication Data
US 2012/0318630 A1  Dec. 20, 2012

(30) Foreign Application Priority Data

Mar. 5, 2010 (JP) .................................. 2010-049192
Mar. 5, 2010 (JP) .................................. 2010-049193
Nov. 2, 2010 (JP) .................................. 2010-246515

(51) Int. Cl.
F16D 25/0638 (2006.01)
B60K 6/48 (2007.10)
F16D 25/12 (2006.01)
F16D 48/02 (2006.01)

(52) U.S. Cl.
CPC ............ *F16D 25/0638* (2013.01); *F16D 25/12* (2013.01); *F16D 2048/0212* (2013.01); *Y10S 903/914* (2013.01)
USPC .................. 192/85.24; 192/109 A; 192/70.27; 180/65.25; 903/914

(58) Field of Classification Search
USPC .......... 192/66.31, 85.34, 85.35, 85.38, 89.22, 192/89.24, 70.27, 70.28, 85.24, 109 A; 180/65.25; 903/914
See application file for complete search history.

(56) References Cited

U.S. PATENT DOCUMENTS 3,308,686 A * 3/1967 Magg et al. .................... 475/121
4,466,502 A * 8/1984 Sakai ............................ 180/247
(Continued)

FOREIGN PATENT DOCUMENTS

CN 1340009 A 3/2002
CN 1343585 A 4/2002
(Continued)

OTHER PUBLICATIONS

Jul. 8, 2011 International Search Report issued in Application No. PCT/JP2011/055720.
(Continued)

*Primary Examiner* — Gene Crawford
*Assistant Examiner* — Terry Chau
(74) *Attorney, Agent, or Firm* — Oliff PLC

(57) ABSTRACT

A vehicle driving apparatus includes a rotating electrical machine and an engagement device, which are disposed on a power transmission path linking an input member drive-coupled to an internal combustion engine and an output member drive-coupled to a wheel. The engagement device includes an engagement input coupled to the input member, an engagement output that forms a pair with the engagement input and is coupled to the rotating electrical machine, a friction member disposed between the engagement input and the engagement output, and a pressing member that presses the friction member in a pressing direction. An oil pressure chamber is formed between the pressing member and either the engagement input or the engagement output. A biasing spring biases the pressing member in the pressing direction when no oil pressure is supplied to the oil pressure chamber and is disposed on an exterior of the oil pressure chamber.

4 Claims, 5 Drawing Sheets

(56) References Cited

U.S. PATENT DOCUMENTS

| | | | |
|---|---|---|---|
| 6,092,985 A | 7/2000 | Winkam | |
| 6,142,280 A | 11/2000 | Koike | |
| 6,258,001 B1* | 7/2001 | Wakuta et al. | 475/5 |
| 6,340,339 B1 | 1/2002 | Tabata et al. | |
| 6,341,584 B1 | 1/2002 | Itoyama et al. | |
| 6,492,742 B1 | 12/2002 | Fujikawa et al. | |
| 6,524,216 B2 | 2/2003 | Suzuki et al. | |
| 6,533,692 B1* | 3/2003 | Bowen | 475/5 |
| 6,585,066 B1 | 7/2003 | Koneda et al. | |
| 6,590,306 B2 | 7/2003 | Terada | |
| 6,679,796 B2 | 1/2004 | Sugano | |
| 6,719,076 B1 | 4/2004 | Tabata et al. | |
| 6,863,140 B2 | 3/2005 | Noreikat et al. | |
| 6,935,450 B1 | 8/2005 | Tsuzuki et al. | |
| 7,059,443 B2 | 6/2006 | Kira | |
| 7,086,978 B2 | 8/2006 | Aikawa et al. | |
| 7,114,484 B2 | 10/2006 | Kaita et al. | |
| 7,114,604 B2 | 10/2006 | Masuya | |
| 7,396,308 B2 | 7/2008 | Tabata et al. | |
| 7,489,114 B2 | 2/2009 | Nomura et al. | |
| 7,810,592 B2 | 10/2010 | Klemen et al. | |
| 7,954,578 B2 | 6/2011 | Kim et al. | |
| 8,155,848 B2 | 4/2012 | Kobayashi et al. | |
| 8,322,504 B2 | 12/2012 | Mueller et al. | |
| 8,333,680 B2 | 12/2012 | Kasuya et al. | |
| 8,360,186 B2 | 1/2013 | Yamamoto et al. | |
| 8,590,649 B2 | 11/2013 | Osawa et al. | |
| 8,602,940 B2 | 12/2013 | Kuwahara et al. | |
| 8,636,090 B2 | 1/2014 | Nomura et al. | |
| 2002/0043883 A1 | 4/2002 | Shimizu | |
| 2003/0127262 A1 | 7/2003 | Noreikat et al. | |
| 2004/0029677 A1 | 2/2004 | Mori et al. | |
| 2004/0154846 A1 | 8/2004 | Kira | |
| 2005/0066933 A1 | 3/2005 | Kaita et al. | |
| 2005/0079942 A1 | 4/2005 | Bauknecht et al. | |
| 2006/0100060 A1 | 5/2006 | Kraska et al. | |
| 2006/0272869 A1 | 12/2006 | Hidaka et al. | |
| 2006/0289209 A1 | 12/2006 | Grosspietsch et al. | |
| 2007/0108857 A1 | 5/2007 | Nomura et al. | |
| 2007/0175723 A1 | 8/2007 | Blessing et al. | |
| 2007/0175726 A1* | 8/2007 | Combes et al. | 192/87.11 |
| 2007/0267270 A1 | 11/2007 | Sudau et al. | |
| 2008/0047799 A1 | 2/2008 | Combes et al. | |
| 2009/0054203 A1 | 2/2009 | Heeke | |
| 2009/0100965 A1 | 4/2009 | Sanji et al. | |
| 2009/0271079 A1 | 10/2009 | Kobayashi et al. | |
| 2009/0283344 A1 | 11/2009 | Arnold et al. | |
| 2010/0038201 A1* | 2/2010 | Mueller et al. | 192/3.29 |
| 2010/0062899 A1* | 3/2010 | Engelmann et al. | 477/86 |
| 2010/0105518 A1 | 4/2010 | Kasuya et al. | |
| 2010/0132504 A1 | 6/2010 | Miller et al. | |
| 2010/0236856 A1 | 9/2010 | Nomura et al. | |
| 2011/0118079 A1 | 5/2011 | Mueller et al. | |
| 2011/0121692 A1 | 5/2011 | Iwase et al. | |
| 2011/0240430 A1 | 10/2011 | Iwase et al. | |
| 2011/0240431 A1 | 10/2011 | Iwase et al. | |
| 2012/0217830 A1 | 8/2012 | Iwase et al. | |
| 2012/0247911 A1 | 10/2012 | Noda et al. | |
| 2012/0258838 A1 | 10/2012 | Hartz et al. | |
| 2012/0318630 A1 | 12/2012 | Iwase et al. | |
| 2012/0319514 A1 | 12/2012 | Iwase et al. | |
| 2013/0008284 A1 | 1/2013 | Sada et al. | |
| 2013/0009522 A1 | 1/2013 | Ozaki et al. | |
| 2013/0057117 A1 | 3/2013 | Suzuki et al. | |

FOREIGN PATENT DOCUMENTS

| | | |
|---|---|---|
| CN | 101018687 A | 8/2007 |
| DE | 102 97 304 T5 | 12/2004 |
| DE | 10 2004 033141 A1 | 2/2006 |
| DE | 10 2006 023 289 | 11/2007 |
| DE | 10 2009 022 272 A1 | 12/2009 |
| EP | 1 800 929 A2 | 6/2007 |
| FR | 2 830 589 | 4/2003 |
| JP | A-03-080612 | 4/1991 |
| JP | U-03-69748 | 7/1991 |
| JP | B2-03-072507 | 11/1991 |
| JP | A-07-217724 | 8/1995 |
| JP | A-08-277859 | 10/1996 |
| JP | A-2002-220078 | 8/2002 |
| JP | A-2005-212494 | 8/2005 |
| JP | A-2006-137406 | 6/2006 |
| JP | A-2007-015810 | 1/2007 |
| JP | A-2007-71083 | 3/2007 |
| JP | A-2007-118717 | 5/2007 |
| JP | A-2009-001127 | 1/2009 |
| JP | A-2009-001165 | 1/2009 |
| JP | A-2009-011010 | 1/2009 |
| JP | A-2009-101730 | 5/2009 |
| JP | A-2009-262659 | 11/2009 |
| WO | WO 2008/092426 A2 | 8/2008 |
| WO | WO 2010/017786 A1 | 2/2010 |

OTHER PUBLICATIONS

Feb. 4, 2013 Office Action issued in U.S. Appl. No. 12/926,446.
Partial translation of Mar. 28, 2013 Office Action issued in Japanese Patent Application No. 2010-049193.
Mar. 18, 2013 Office Action issued in U.S. Appl. No. 12/926,447.
U.S. Appl. No. 12/948,297, filed Nov. 17, 2010.
U.S. Appl. No. 13/522,597, filed Jul. 17, 2012.
U.S. Appl. No. 13/522,426, filed Jul. 26, 2012.
U.S. Appl. No. 12/926,446, filed Nov. 18, 2010.
U.S. Appl. No. 13/502,909, filed Apr. 19, 2012.
U.S. Appl. No. 12/926,447, filed Nov. 18, 2010.
U.S. Appl. No. 13/522,651, filed Jul. 17, 2012.
May 6, 2011 International Search Report issued in Application No. PCT/JP2011/053886.
May 31, 2011 International Search Report issued in Application No. PCT/JP2011/055721.
May 11, 2011 International Search Report issued in Application No. PCT/JP2011/053887.
Feb. 8, 2011 International Search Report issued in Application No. PCT/JP2010/070714 (with translation).
Feb. 8, 2011 International Search Report issued in Application No. PCT/JP2010/070716 (with translation).
Feb. 8, 2011 International Search Report issued in Application No. PCT/JP2010/070717 (with translation).
Apr. 26, 2013 Notice of Allowance and Fee(s) Due issued in U.S. Appl. No. 12/926,446.
Jun. 27, 2013 Partial Translation of Notification of Reasons for Refusal issued in Japanese Application No. JP2010-246511 (English Partial Translation Only).
Nov. 7, 2013 Notification of Reason(s) for Refusal issued in Japanese Patent Application No. 2010-246515 (partial translation).
Oct. 17, 2013 Office Action issued in U.S. Appl. No. 12/926,447.
Aug. 2, 2013 Office Action issued in U.S. Appl. No. 13/522,597, filed Jul. 17, 2012 in the name of Suyama.
Feb. 8, 2011 International Search Report issued in Application No. PCT/JP2010/070715 (with translation).
Aug. 30, 2013 Notice of Allowance issued in U.S. Appl. No. 12/926,446.
Dec. 9, 2013 Corrected Notice of Allowability issued in U.S. Appl. No. 12/926,446.
Jun. 20, 2014 Notice of Allowance issued in U.S. Appl. No. 13/502,909.
Nice et al., "How Clutches Work," *HowStuffWorks.com*, Oct. 16, 2007, <http://auto.howstuffworks.com/clutch.htm>.
Office Action issued in U.S. Appl. No. 13/502,909 dated Mar. 6, 2014.
Office Action issued in U.S. Appl. No. 13/522,597 dated Mar. 7, 2014.
Apr. 25, 2014 European Search Report issued in Application No. 10831658.9.
May 6, 2014 Office Action from U.S. Appl. No. 12/926,447.
May 6, 2014 Notice of Allowance and Fees Due from U.S. Appl. No. 12/948,297.

(56) References Cited

OTHER PUBLICATIONS

Apr. 25, 2014 Notice of Allowance issued in U.S. Appl. No. 13/522,426.

Sep. 11, 2014 Office Action issued in U.S. Appl. No. 13/522,597.

Dec. 18, 2014 Notice of Allowance issued in U.S. Appl. No. 12/926,447.

* cited by examiner

VEHICLE DRIVING APPARATUS

INCORPORATION BY REFERENCE

The disclosure of Japanese Patent Applications No. 2010-246515 filed on Nov. 2, 2010, No. 2010-049192 filed on Mar. 5, 2010, No. 2010-049193 filed on Mar. 5, 2010, including the specification, drawings and abstract is incorporated herein by reference in its entirety.

BACKGROUND OF THE INVENTION

The present invention relates to a vehicle driving apparatus in which a rotating electrical machine and an engagement device are disposed on a power transmission path linking an input member drive-coupled to an internal combustion engine and an output member drive-coupled to a vehicle wheel.

DESCRIPTION OF THE RELATED ART

An apparatus described in Japanese Patent Application Publication No. JP-A-2009-1165 below, for example, is already known as a vehicle driving apparatus of the type described above. As shown in FIGS. 2, 3, and so on of Japanese Patent Application Publication No. JP-A-2009-1165, in this vehicle driving apparatus, a working oil pressure chamber (a first oil pressure chamber r1) supplied with a working oil pressure for a pressing member (a piston P) is formed between an engagement output side member (a first member M11) provided in an engagement device (a first clutch CL1 in Japanese Patent Application Publication No. JP-A-2009-1165; likewise hereafter) and the pressing member, and a biasing spring (a coil spring SPRING) that biases the pressing member to a friction member (a first friction plate F1) side when no working oil pressure is supplied to the working oil pressure chamber is disposed in the working oil pressure chamber. In the apparatus of Japanese Patent Application Publication No. JP-A-2009-1165, the friction member can be frictionally engaged at a predetermined engagement pressure using a biasing force (an elastic force) of the biasing spring by setting both the oil pressure supplied to the working oil pressure chamber and an oil pressure supplied to an oil-tight second oil pressure chamber r2 formed on an opposite side of the pressing member to the working oil pressure chamber at zero, and as a result, a partial engagement state (a so-called half clutch state) can be realized easily However, with a constitution such as that of the apparatus according to Japanese Patent Application Publication No. JP-A-2009-1165, in which the biasing spring is disposed in the working oil pressure chamber, a volume of the working oil pressure chamber must be increased by an amount corresponding to a pressing direction length of a region occupied by the biasing spring when the biasing spring is in a maximum compression state. When the volume of the working oil pressure chamber increases, a time required to fill the working oil pressure chamber with the working oil increases correspondingly. Hence, with the apparatus of Japanese Patent Application Publication No. JP-A-2009-1165, a reduction in responsiveness occurs with respect to engagement and disengagement of the engagement device.

SUMMARY OF THE INVENTION

Therefore, demand exists for the realization of a vehicle driving apparatus with which an engagement device can be set in a partial engagement state easily, and a responsiveness of the engagement device can be maintained at a favorable level.

A vehicle driving apparatus according to a first aspect of the present invention includes a rotating electrical machine and an engagement device. In the vehicle driving apparatus, the rotating electrical machine and the engagement device are disposed on a power transmission path linking an input member drive-coupled to an internal combustion engine and an output member drive-coupled to a vehicle wheel, the engagement device includes an engagement input side member coupled to the input member, an engagement output side member that forms a pair with the engagement input side member and is coupled to the rotating electrical machine, a friction member disposed between the engagement input side member and the engagement output side member, and a pressing member that presses the friction member in a pressing direction, a working oil pressure chamber that is supplied with a working oil pressure for pressing the pressing member in the pressing direction is formed between the pressing member and either the engagement input side member or the engagement output side member, and a biasing spring that biases the pressing member in the pressing direction when no working oil pressure is supplied to the working oil pressure chamber is disposed on an exterior of the working oil pressure chamber.

Note that the term "drive-coupled" indicates a state where two rotary elements are coupled to be capable of transmitting drive power, and is used as a concept including a state where the two rotary elements are coupled to rotate integrally or a state where the two rotary elements are coupled to be capable of transmitting drive power via one or more transmission members. These transmission members include various members for transmitting rotation at an identical speed or a shifted speed, such as a shaft, a gear mechanism, a belt, and a chain. Further, an engagement device that transmits rotation and drive power selectively, a friction clutch or a mesh clutch, for example, may be used as the transmission member.

Furthermore, the term "rotating electrical machine" is used as a concept including a motor (electric motor), a generator (electric generator), and a motor/generator that functions as both a motor and a generator as necessary.

According to the first aspect, the pressing member can be operated in accordance with the oil pressure supplied to the working oil pressure chamber, and therefore the input member and the rotating electrical machine can be drive-coupled selectively by the engagement device. At this time, the pressing member is biased in the pressing direction by the biasing spring, irrespective of the working oil pressure, and therefore the friction member can be frictionally engaged at a predetermined engagement pressure by a biasing force of the biasing spring even when no working oil pressure is supplied to the working oil pressure chamber. As a result, a partial engagement state can be realized in the engagement device easily.

Further, in the first aspect, the biasing spring is disposed on the exterior of the working oil pressure chamber, and therefore the volume of the working oil pressure chamber can be determined without taking into account the existence of the biasing spring. In other words, the volume of the working oil pressure chamber does not have to be enlarged even when the biasing spring is provided. As a result, the time required to fill the working oil pressure chamber with working oil does not increase, and therefore a favorable degree of responsiveness can be maintained with respect to engagement and disengagement of the engagement device.

Hence, a vehicle driving apparatus with which an engagement device can be set in a partial engagement state easily and a responsiveness of the engagement device can be maintained at a favorable level can be realized.

Here, according to a second aspect of the present invention, the engagement output side member may include an axial direction extending portion that extends in an axial direction to cover at least a radial direction outer side of the friction member, and a radial direction extending portion that extends in a radial direction to an anti-pressing direction side, i.e. in an opposite direction to the pressing direction relative to the friction member, the working oil pressure chamber may be formed on a radial direction inner side of the friction member, the pressing member may be provided to press the friction member from the radial direction extending portion side, and the biasing spring may be disposed between the radial direction extending portion and the pressing member on a radial direction inner side of the axial direction extending portion and a radial direction outer side of the working oil pressure chamber.

According to the second aspect, the pressing member provided to press the friction member from the radial direction extending portion side of the engagement output side member can be biased appropriately in the pressing direction by the biasing spring disposed between the radial direction extending portion and the pressing member. Further, with this constitution of the second aspect, the biasing spring presses the pressing member on the radial direction outer side of the working oil pressure chamber. Hence, the biasing force of the biasing spring can be exerted efficiently on the friction member disposed likewise on the radial direction outer side of the working oil pressure chamber from a comparatively close position.

Further, according to a third aspect of the present invention, the engagement output side member may include a fastening attachment portion formed thickly to bolt a rotor member of the rotating electrical machine formed integrally with the radial direction extending portion, and the biasing spring may be disposed to contact a step portion formed on a surface of the fastening attachment portion facing the pressing direction side.

According to the third aspect, the biasing spring is disposed in contact with the thickly formed fastening attachment portion, and therefore one end of the biasing spring can be supported with stability by the fastening attachment portion. At this time, the biasing spring can be supported with stability using the site for bolting the rotor member of the rotating electrical machine, and therefore a special component or the like need not be provided additionally. Furthermore, with this constitution of the third aspect, the biasing spring is disposed in contact with the step portion formed on the surface of the fastening attachment portion that faces the pressing direction side, and therefore, when the biasing spring is formed in an overall annular shape, the biasing spring can be positioned appropriately in the radial direction by the step portion.

Further, according to a fourth aspect of the present invention, the pressing member may include a projecting portion having an arc-shaped cross-section, which projects to the anti-pressing direction side, i.e. in the opposite direction to the pressing direction, and the biasing spring may be disposed to contact the projecting portion.

According to the fourth aspect, the pressing member is capable of receiving the biasing force of the biasing spring on the projecting portion having an arc-shaped cross-section. Therefore, the pressing member can be pressed smoothly regardless of displacement in a contact portion between the biasing spring and the pressing member accompanying elastic deformation of the biasing spring or the like. Note that this constitution of the fourth aspect is particularly effective when the biasing spring is formed to have flat side faces and a plate-shaped cross-section.

DETAILED DESCRIPTION OF THE EMBODIMENTS

Figure 1:
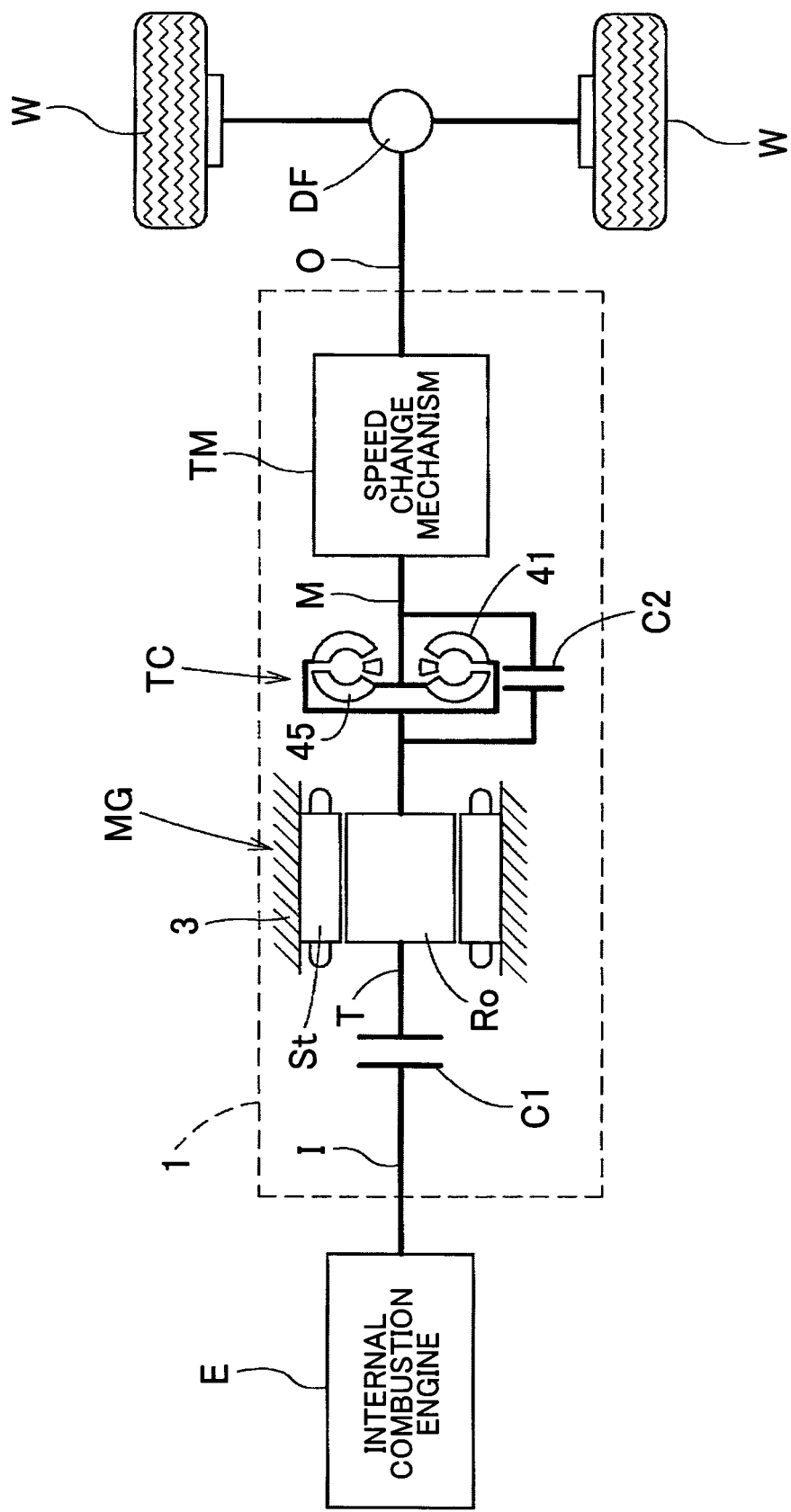
FIG. 1 is a pattern diagram showing a schematic constitution of a driving apparatus according to an embodiment.

An embodiment of the present invention will now be described with reference to the drawings. FIG. 1 is a pattern diagram showing a schematic constitution of a driving apparatus 1 according to this embodiment. The driving apparatus 1 is a driving apparatus (a hybrid driving apparatus) for a hybrid vehicle that uses one or both of an internal combustion engine E and a rotating electrical machine MG as a vehicle drive power source. The driving apparatus 1 is constituted by a so-called one motor parallel type hybrid vehicle driving apparatus. The driving apparatus 1 according to this embodiment will be described in detail below.

1. Overall Constitution of Driving Apparatus

First, the overall constitution of the driving apparatus 1 according to this embodiment will be described. As shown in FIG. 1, the driving apparatus 1 includes an input shaft 1 drive-coupled to the internal combustion engine E, which serves as a first drive power source of the vehicle, an output shaft O drive-coupled to a vehicle wheel W, and the rotating electrical machine MG, which serves as a second drive power source of the vehicle. The driving apparatus 1 also includes an input clutch C1, a torque converter TC, and a speed change mechanism TM. The input clutch C1, the rotating electrical machine MG, the torque converter TC, and the speed change mechanism TM are disposed on a power transmission path linking the input shaft I to the output shaft O in order from the input shaft I side. Further, each of these constitutions, with the exception of a part of the input shaft I and a part of the output O, is housed in a case (a driving apparatus case) 3. In this embodiment, the input shaft I corresponds to an "input member" of the present invention, and the output shaft O corresponds to an "output member" of the present invention.

Note that in this embodiment, the input shaft I, rotating electrical machine MG, torque converter TC, and output shaft O are all disposed on a axis center X (see FIG. 2), and therefore the driving apparatus 1 according to this embodiment has a uniaxial constitution, which is suitable for a case in which the apparatus is installed in an FR (front-engine, rear-wheel drive) type vehicle. Further, an "axial direction", a "radial direction", and a "circumferential direction" are defined in the following description using the axis center X as a reference in the absence of further differentiation. Moreover, as regards description of the axial direction when focusing on a specific site of the driving apparatus 1, a direction heading toward the internal combustion engine E side (the left side in FIG. 2), i.e. extending to one side in the axial direction, will be referred to as an "axial first direction A1", and a direction heading toward the output shaft O side (the right side in FIG. 2), i.e. extending to the other side in the axial direction, will be referred to as an "axial second direction A2".

The internal combustion engine E generates power when driven by burning fuel inside an engine, and various well-known engines, such as a gasoline engine or a diesel engine, for example, may be employed. In this example, an output rotary shaft such as a crankshaft of the internal combustion engine E is drive-coupled to the input shaft I via a damper device (not shown). Further, the input shaft I is drive-coupled to the rotating electrical machine MG via the input clutch C1. When the input clutch C1 is in an engaged state, the internal combustion engine E and the rotating electrical machine MG are drive-coupled via the input shaft I so as to rotate integrally, and when the input clutch C1 is in a disengaged state, the internal combustion engine E and the rotating electrical machine MG are disconnected. In other words, the input clutch C1 selectively drive-couples the internal combustion engine E and the rotating electrical machine MG. In this embodiment, the input clutch C1 corresponds to an "engagement device" of the present invention.

The rotating electrical machine MG is constituted by a stator St and a rotor Ro, and is capable of functioning as a motor that generates motive power upon reception of a supply of electric power and a generator that generates electric power upon reception of a supply of motive power. For this purpose, the rotating electrical machine MG is electrically connected to a storage device (not shown). In this example, a battery is used as the storage device. Note that a capacitor or the like may also be used favorably as the storage device, The rotating electrical machine MG performs power running upon reception of a supply of electric power from the battery or supplies electric power generated using torque (drive power) output by the internal combustion engine E or an inertial force of the vehicle to the battery for storage therein. The rotor Ro of the rotating electrical machine MG is drive-coupled to a pump impeller 41 of the torque converter TC via a power transmission member T.

The torque converter TC is a device for converting the torque of one or both of the internal combustion engine E and the rotating electrical machine MG and transmitting the converted torque to an intermediate shaft M. The torque converter TC includes the pump impeller 41, which is drive-coupled to the rotor Ro of the rotating electrical machine MG via the power transmission member T, a turbine runner 45 drive-coupled to the intermediate shaft M so as to rotate integrally therewith, and a stator 48 (see FIG. 2) provided between the pump impeller 41 and the turbine runner 45. The torque converter TC is capable of performing torque transmission between the pump impeller 41 and the turbine runner 45 via oil (an example of a fluid) charged into the interior thereof. When a rotation speed difference occurs between the pump impeller 41 and the turbine runner 45 at this time, torque converted in accordance with a rotation speed ratio is transmitted.

The torque converter TC also includes a lockup clutch C2. The lockup clutch C2 selectively drive-couples the pump impeller 41 and the turbine runner 45. When the lockup clutch C2 is in an engaged state, the torque converter TC transmits the torque of one or both of the internal combustion engine E and the rotating electrical machine MG to the intermediate shaft M as is, i.e. without passing through the oil in the interior. The intermediate shaft M serves as an input shaft (a shift input shaft) of the speed change mechanism TM.

The speed change mechanism TM is a device for shifting a rotation speed of the intermediate shaft M at a predetermined speed ratio and transmitting the shifted rotation to the output shaft O. In this embodiment, an automatic stepped speed change mechanism capable of switching between a plurality of shift speeds having different speed ratios is used as the speed change mechanism TM. Note that an automatic continuously variable speed change mechanism capable of modifying the speed ratio continuously, a manual stepped speed change mechanism capable of switching between a plurality of shift speeds having different speed ratios, and so on may also be used as the speed change mechanism TM. The speed change mechanism TM shifts the rotation speed of the intermediate shaft M at a predetermined speed ratio set at each point in time and performs torque conversion, and then transmits the shifted rotation and the converted torque to the output shaft O. The rotation and torque transmitted to the output shaft O are distributed to two vehicle wheels W on a left side and a right side via an output differential gear device DF. As a result, the torque of one or both of the internal combustion engine E and the rotating electrical machine MG is transmitted to the vehicle wheels W, and the driving apparatus 1 is thus capable of causing the vehicle to travel.

2. Constitutions of Respective Parts of Driving Apparatus

Figure 3:
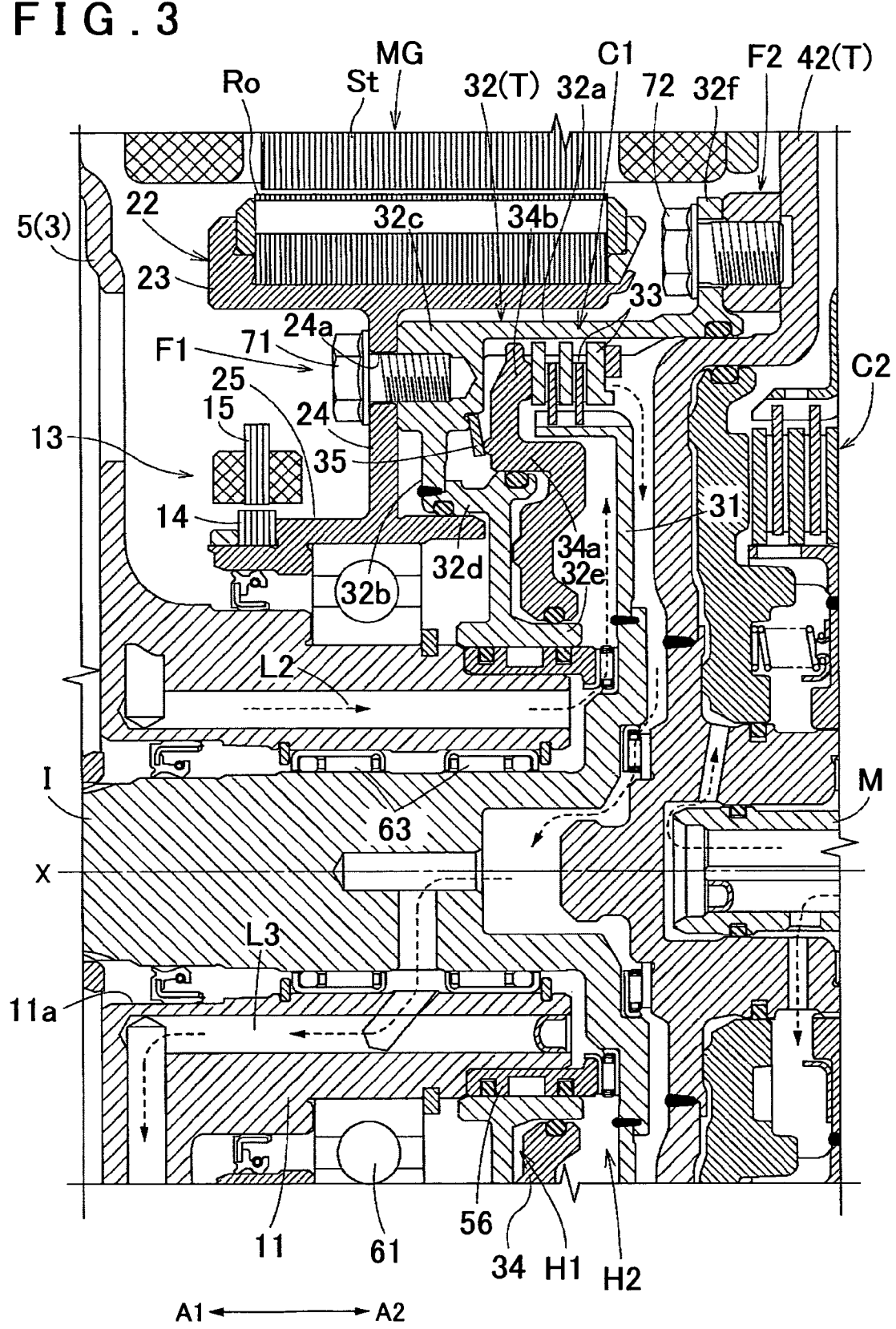
FIG. 3 is a sectional view of main parts of the driving apparatus.
Figure 4:
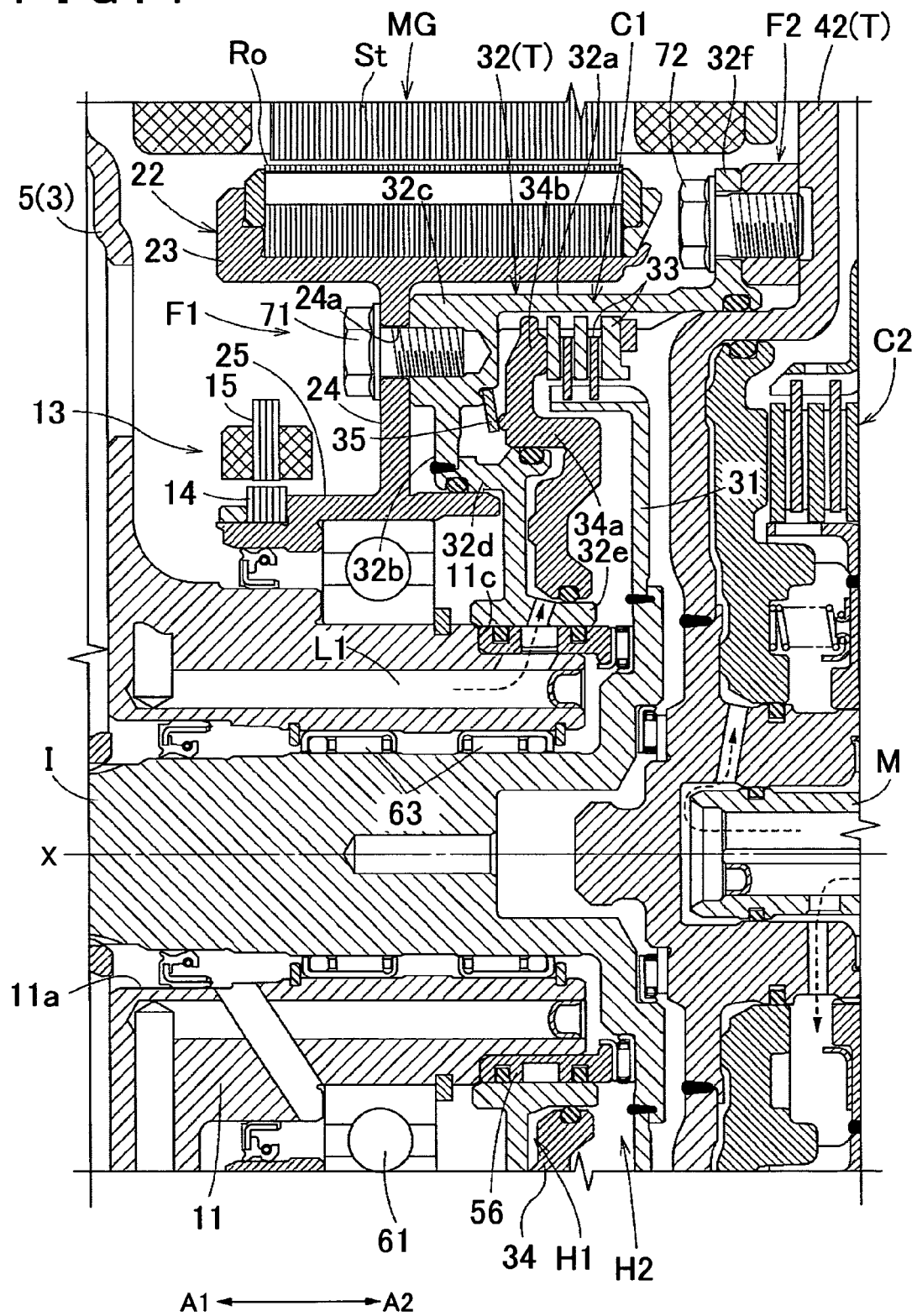
FIG. 4 is a sectional view of main parts of the driving apparatus.
Figure 5:
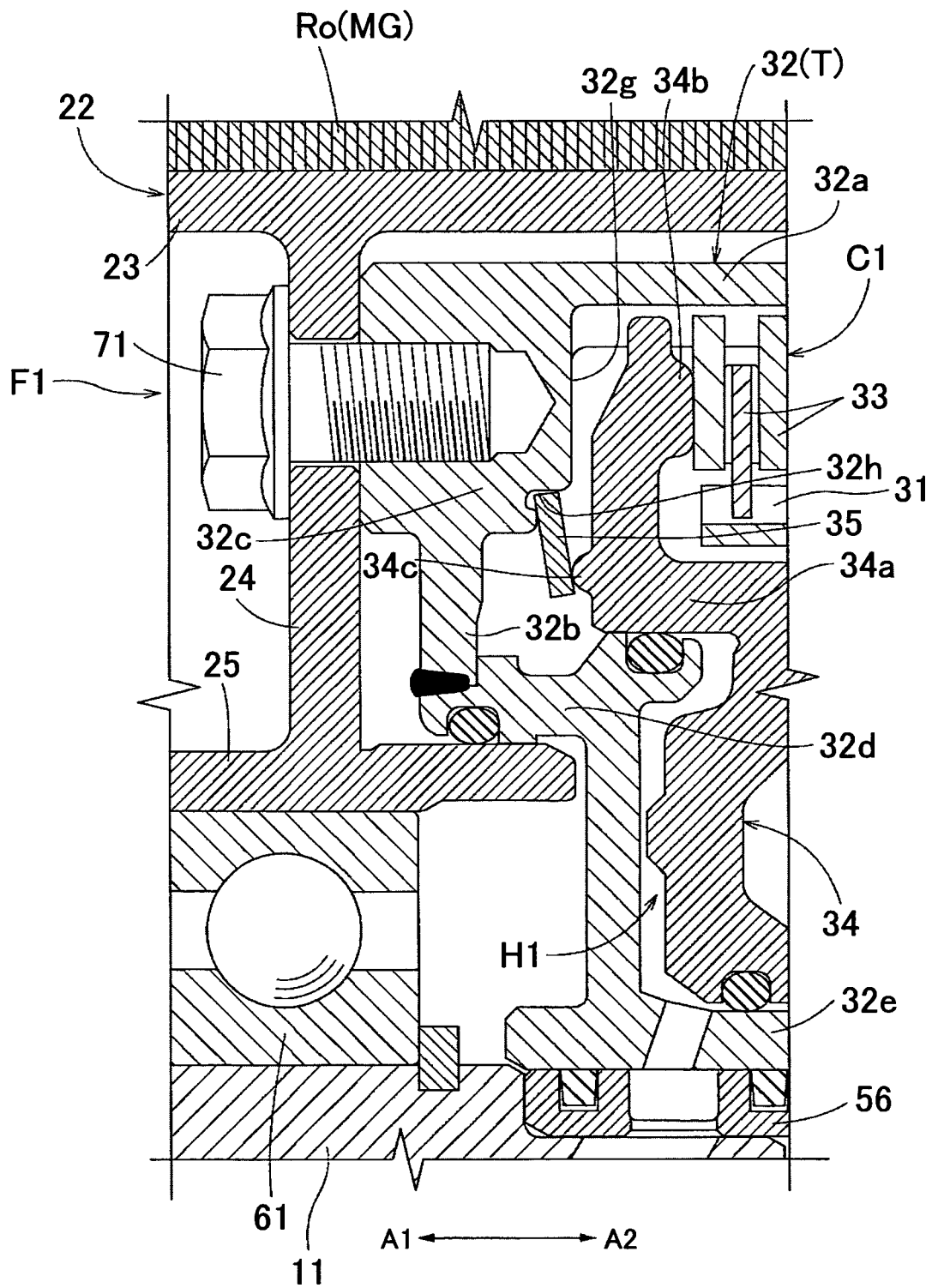
FIG. 5 is an enlarged view of the main parts of FIG. 4.

Next, the constitutions of the respective parts of the driving apparatus 1 according to this embodiment will be described with reference to FIGS. 2 to 5. Note that FIG. 3 is a partially enlarged view of the sectional view shown in FIG. 2, FIG. 4 is a sectional view taken in a different circumferential direction position to FIG. 3, and FIG. 5 is an enlarged view of the main parts of FIG. 4.

2-1. Case

Figure 2:
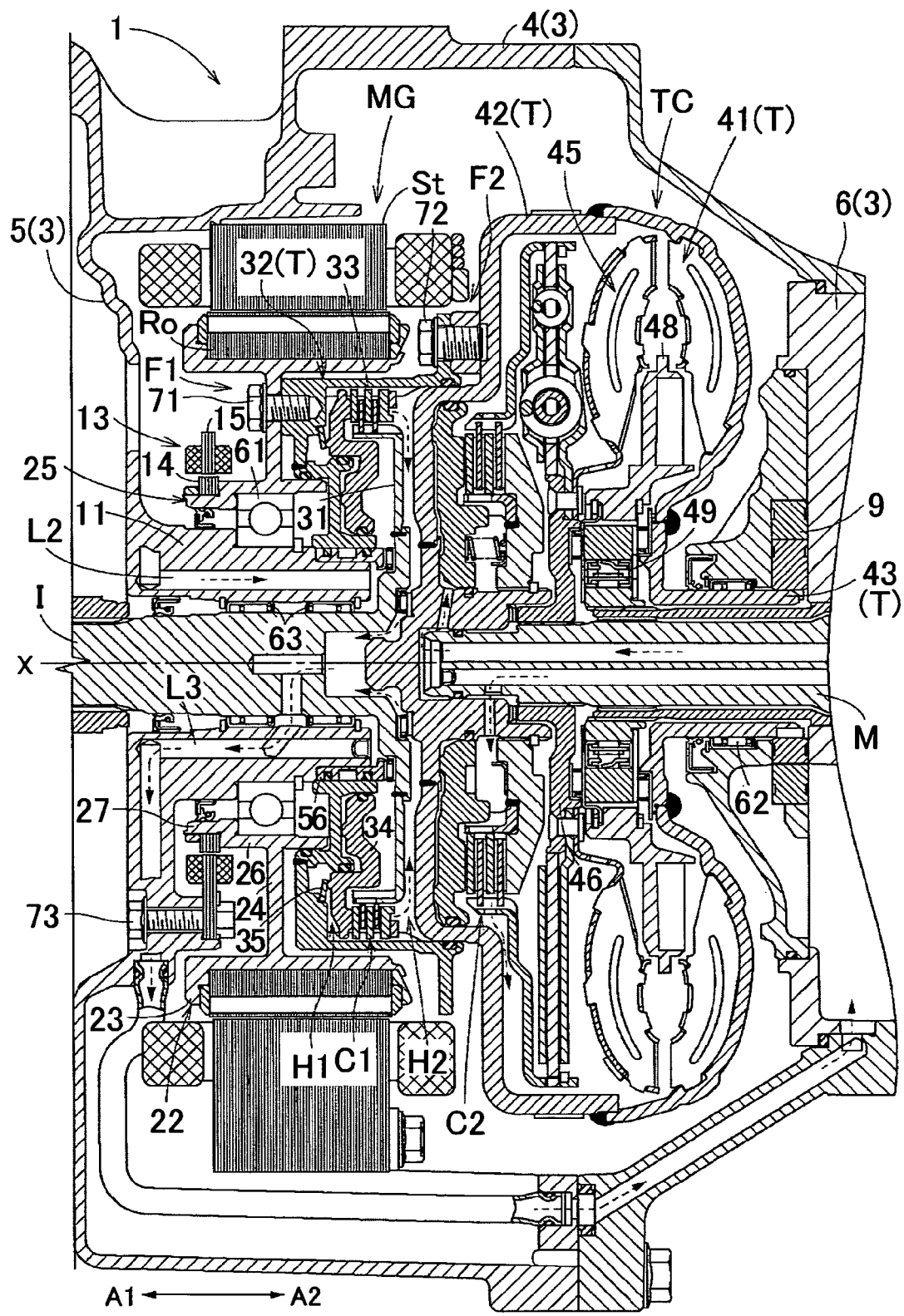
FIG. 2 is a partial sectional view of the driving apparatus.

As shown in FIG. 2, the case 3 is formed in a substantially cylindrical shape. In this embodiment, the case 3 includes a peripheral wall 4 that has a substantially cylindrical shape and covers a radial direction outer side of the rotating electrical machine MG the input clutch C1, the torque converter TC, and so on, an end portion support wall 5 that covers an axial first direction A1 side of the rotating electrical machine MG and the input clutch C1, and an intermediate support wall 6 that covers an axial second direction A2 side of the torque converter TC. The rotating electrical machine MG, the input clutch C1, and the torque converter TC are housed in an internal space of the case 3 between the end portion support wall 5 and the intermediate support wall 6. Further, although not shown in the drawings, the speed change mechanism TM is housed in a space on the axial second direction A2 side of the intermediate support wall 6.

The end portion support wall 5 is shaped to extend at least in the radial direction, and here is constituted by a substantially disc-shaped wall portion extending in the radial direction and the circumferential direction. A tubular projecting portion 11 is provided in a radial direction central portion of the end portion support wall 5. The tubular projecting portion 11 is a cylindrical projecting portion disposed coaxially with the axis center X and formed to project from the end portion support wall 5 toward the axial second direction A2 side. The tubular projecting portion 11 is formed integrally with the end portion support wall 5. An axial direction length of the tubular projecting portion 11 is greater than an axial direction length of the rotor Ro. An axial center through hole 11a (see FIG. 3 and so on) penetrating in the axial direction is formed in a radial direction central portion of the tubular projecting portion 11. The input shaft I is inserted into the axial center through hole 11a. Thus, the input shaft I is disposed to penetrate to a radial direction inner side of the tubular projecting portion 11 and inserted into the case 3 through the end portion support wall 5.

In this embodiment, as shown partially in FIGS. 3 and 4, a first oil passage L1, a second oil passage L2, and a third oil passage L3 are formed in the tubular projecting portion 11. The first oil passage L1 is an oil supply passage for supplying oil to a working oil pressure chamber H1, to be described below, of the input clutch C1 (see FIG. 4). The second oil passage L2 is an oil supply passage for supplying oil to a circulation oil pressure chamber H2, to be described below, of the input clutch C1 (see FIG. 3). The third oil passage L3 is an oil discharge passage for returning oil discharged from the circulation oil pressure chamber H2 to an oil pan (not shown) (see FIG. 3).

The intermediate support wall 6 is shaped to extend at least in the radial direction, and here is constituted by a substantially disc-shaped wall portion extending in the radial direction and the circumferential direction. In this embodiment, the intermediate support wall 6 is formed as a separate member to the peripheral wall 4 and fastened fixedly to a step portion formed on an inner peripheral surface of the peripheral wall 4 by a fastening member such as a bolt. An oil pump 9 is provided on the intermediate support wall 6. A pump rotor of the oil pump 9 is drive-coupled to the pump impeller 41 via a pump drive shaft 43 so as to rotate integrally therewith. As the pump impeller 41 rotates, the oil pump 9 discharges oil, thereby generating oil pressure for supplying the oil to the respective parts of the driving apparatus 1.

2-2. Rotating Electrical Machine

As shown in FIG. 2, the rotating electrical machine MG is disposed on the axial second direction A2 side of the end portion support wall 5 and on the axial first direction A1 side of the torque converter TC. Further, the rotating electrical machine MG is disposed on the radial direction outer side of the input shaft I and the input clutch C1 The rotating electrical machine MG and the input clutch C1 are disposed in positions that overlap partially when viewed from the radial direction. Note that when the phrase "overlap partially when viewed from a certain direction" is used with regard to the arrangement of two members, this means that when the certain direction is assumed to be a sight line direction and a viewpoint is shifted in respective orthogonal directions to the sight line direction, viewpoints from which the two members appear to overlap exist in at least some regions. The stator St of the rotating electrical machine MG is fixed to the case 3. The rotor Ro is disposed on the radial direction inner side of the stator St. The rotor Ro is disposed opposite the stator St via a minute gap in the radial direction, and supported by the case 3 to be capable of rotating. More specifically, a rotor supporting member 22 that supports the rotor Ro and rotates integrally with the rotor Ro is supported rotatably on the tubular projecting portion 11 of the case 3 via a first bearing 61. In this embodiment, a "rotor member" of the present invention is constituted by the integrally rotating rotor Ro and rotor support member 22.

As shown in FIGS. 2 to 4, the rotor supporting member 22 supports the rotor Ro of the rotating electrical machine MG from the radial direction inner side. The rotor supporting member 22 is disposed on the axial first direction A1 side of the input clutch C1. The rotor supporting member 22 is formed in a shape that extends at least in the radial direction in order to support the rotor Ro relative to the first bearing 61 disposed on the radial direction inner side of the rotor Ro. In this embodiment, the rotor supporting member 22 includes a rotor holding portion 23, a radial direction extending portion 24, and a supporting cylindrical portion 25.

The rotor holding portion 23 is a part that holds the rotor Ro. The rotor holding portion 23 is disposed coaxially with the axis center X and formed in a substantially cylindrical shape so as to contact an inner peripheral surface and both axial direction side faces of the rotor Ro. The radial direction extending portion 24 is formed integrally with the rotor holding portion 23 and formed to extend to the radial direction inner side from the vicinity of an axial direction central portion of the rotor holding portion 23. In this example, the radial direction extending portion 24 is constituted by an annular plate-shaped portion that extends in the radial direction and the circumferential direction. Further, first bolt insertion holes 24a are provided in the radial direction extending portion 24 in a plurality of circumferential direction locations (see FIG. 3 and so on). First bolts 71 for fastening the rotor supporting member 22 to a tubular connecting member 32 are inserted into the first bolt insertion holes 24a.

The supporting cylindrical portion 25 is provided integrally with a radial direction inner side end portion of the radial direction extending portion 24. The supporting cylindrical portion 25 is constituted by a cylindrical portion disposed coaxially with the axis center X and formed to extend to both axial direction sides from the radial direction extending portion 24. In this embodiment, the first bearing 61 is disposed in contact with an inner peripheral surface of the supporting cylindrical portion 25, and therefore the rotor supporting member 22 is supported by the first bearing 61 disposed between the inner peripheral surface of the supporting cylindrical portion 25 and the outer peripheral surface of the tubular projecting portion 11. As a result, the rotor supporting member 22 is supported rotatably on the outer peripheral surface of the tubular projecting portion 11 via the first bearing 61. In this embodiment, a seal member is disposed between the supporting cylindrical portion 25 and the tubular projecting portion 11 on the axial first direction A1 side of the first bearing 61. As a result, the supporting cylindrical portion 25 and the tubular projecting portion 11 are tightly sealed from each other.

Further, in this embodiment, a rotation sensor 13 for detecting a rotation position of the rotor Ro relative to the stator St in the rotating electrical machine MG is provided on an outer peripheral surface of the supporting cylindrical portion 25. The rotation sensor 13 is disposed between the end portion support wall 5 and the rotor supporting member 22 (here, mainly the radial direction extending portion 24) in the axial direction. In other words, the end portion support wall 5 is disposed on an opposite side of the rotation sensor 13 to the rotor supporting member 22 in the axial direction. Note that in this example, a resolver is used as the rotation sensor 13

2-3. Input Clutch

The input clutch C1 is a frictional engagement device that selectively drive-couples the input shaft I to the rotating electrical machine MG and the torque converter TC. The input clutch C1 is constituted by a multiplate wet clutch mechanism. Further, as shown in FIG. 2, the input clutch C1 is disposed between the rotor supporting member 22 and the torque converter TC in the axial direction. Furthermore, in the radial direction, the input clutch C1 is disposed between the tubular projecting portion 11 and the rotor Ro of the rotating electrical machine MG The tubular projecting portion 11, the input clutch C1, and the rotor Ro are disposed to overlap partially when viewed from the radial direction. The input clutch C1 includes a clutch hub 31, the tubular connecting member 32, a friction member 33, a piston 34, and the working oil pressure chamber H1.

The input clutch C1 includes an input side friction member and an output side friction member as the friction members 31 The input side friction member and the output side friction member together form a pair. Here, the input clutch C1 includes a plurality of input side friction members and a plurality of output side friction members which are disposed alternately in the axial direction. The plurality of friction members 33 are all formed in an annular plate shape and disposed between the clutch hub 31 and the tubular connecting member 32.

The clutch hub 31 is an annular plate-shaped member that extends in the radial direction so as to support the plurality of input side friction members (in this example, hub side friction members) from the radial direction inner side. The clutch hub 31 is formed to pass between the piston 34 and a cover portion 42, to be described below, of the torque converter TC in the axial direction and extend in the radial direction, and a radial direction inner side end portion of the clutch hub 31 is coupled to the input shaft I. As a result, the input shaft I and the clutch hub 31 are coupled to rotate integrally. Note that the clutch hub 31 is a member for transmitting the rotation and torque of the internal combustion engine E via the input shaft I, and serves as an input side rotary member of the input clutch C1. In this embodiment, the clutch hub 31 corresponds to an "engagement input side member" of the present invention.

The tubular connecting member 32 is a substantially cylindrical member that is formed to cover at least a radial direction outer side of the plurality of friction members 33 and support the output side friction members (in this example, drum side friction members) from the radial direction outer side. The tubular connecting member 32 is constructed to function as a clutch drum of the input clutch C1. Further, the tubular connecting member 32 includes a part formed in an overall bowl shape so as to further cover the axial first direction A1 side of the piston 34 and the radial direction outer side of the piston 34. The tubular connecting member 32 is coupled to the rotor supporting member 22 of the rotating electrical machine MG and also to the cover portion 42. The tubular connecting member 32 serves as an output side rotary member of the input clutch C1, which forms a pair with the clutch hub 31, to transmit to the torque converter TC on the output shaft O side the rotation and torque input into the clutch hub 31 when the input clutch C1 is engaged. In this embodiment, the tubular connecting member 32 corresponds to an "engagement rotary member" of the present invention.

As shown in FIGS. 3 and 4, the tubular connecting member 32 serving as the clutch drum includes an axial direction extending portion 32a, a radial direction extending portion 32b, a tubular extending portion 32d, a tubular projecting portion 32e, and a radial direction extending portion 32f. The axial direction extending portion 32a is formed in a cylindrical shape and disposed coaxially with the axis center X. The axial direction extending portion 32a is formed in a tubular shape that extends in the axial direction to cover at least the radial direction outer side of the friction members 33. The axial direction extending portion 32a contacts the radial direction extending portion 24 of the rotor supporting member 22 on the axial first direction A1 side and the cover portion 42 of the torque converter TC on the axial second direction A2 side. The cover portion 42 is fitted to the axial direction extending portion 32a so as to contact the axial direction extending portion 32a in the radial direction. The radial direction extending portion 32f is formed integrally with the axial direction extending portion 32a and formed in an annular plate shape to extend to the radial direction outer side from an axial second direction A2 side end portion of the axial direction extending portion 32a.

The radial direction extending portion 32b is formed integrally with the axial direction extending portion 32a in a substantially annular plate shape so as to extend toward the radial direction inner side from an axial first direction A1 side end portion of the axial direction extending portion 32a. The radial direction extending portion 32b is disposed on the axial first direction A1 side of the friction members 33. An attachment portion 32c is formed integrally with the axial direction extending portion 32a and the radial direction extending portion 32b in a connection site between the axial direction extending portion 32a and the radial direction extending portion 32b, The attachment portion 32c is formed as a thick portion having a predetermined thickness in the axial direction and the radial direction, and serves as a site in which the tubular connecting member 32 and the rotor supporting member 22 are attached, First bolt fastening holes in which the first bolts 71 are fastened are provided in the attachment portion 32c in a plurality of circumferential direction locations. In this embodiment, the attachment portion 32c corresponds to a "fastening attachment portion" of the present invention.

Further, the cylindrical tubular extending portion 32d, which is formed integrally with the radial direction extending portion 32b so as to extend in the axial direction, is provided in the radial direction extending portion 32b on the radial direction inner side of the attachment portion 32c. In other words, the radial direction extending portion 32b is shaped such that a site thereof on the radial direction inner side of the tubular extending portion 32d is offset to the axial second direction A2 side relative to a site thereof on the radial direction outer side. The tubular extending portion 32d is fitted to the supporting cylindrical portion 25 of the rotor supporting member 22 so as to contact the supporting cylindrical portion 25 in the radial direction.

The tubular projecting portion 32e is formed integrally with the radial direction extending portion 32b in a cylindrical shape so as to extend to either axial direction side from a radial direction inner side end portion of the radial direction extending portion 32b. The tubular projecting portion 32e is disposed on the radial direction inner side of the friction members 33 so as to overlap the friction members 33 partially when viewed from the radial direction. Further, the tubular projecting portion 32e is disposed on the radial direction outer side of an axial second direction A2 side end portion of the tubular projecting portion 11 of the case 3 so as to oppose the tubular projecting portion 11 in the radial direction via a predetermined gap. A sleeve 56 is disposed between the tubular projecting portion 32e and the tubular projecting portion 11 of the case 3. More specifically, the sleeve 56 is disposed to contact an inner peripheral surface of the tubular projecting portion 32e and an outer peripheral surface of the tubular projecting portion 11 of the case 3.

The piston 34, which presses the friction members 33 in a pressing direction, is disposed to be capable of sliding in the axial direction relative to an outer peripheral surface of the tubular extending portion 32d and an outer peripheral surface of the tubular projecting portion 32e. In this embodiment, the piston 34 corresponds to a "sliding pressing member" of the present invention. In this embodiment, the piston 34 is provided to press the friction members 33 from the axial first direction A1 side, i.e. the radial direction extending portion 32b side. Hence, in this example, the axial second direction A2 corresponds to the aforementioned "pressing direction" and the axial first direction A1 corresponds to an "anti-pressing direction". In this embodiment, the piston 34 includes a tubular extending portion 34a that has a tubular shape and is formed in a predetermined radial direction position so as to extend in the axial direction. The piston 34 is shaped such that a site thereof on the radial direction outer side of the tubular extending portion 34a is offset to the axial first direction A1 side from a site thereof on the radial direction inner side.

Here, the site of the piston 34 on the radial direction outer side of the tubular extending portion 34a serves as a contact pressing portion 34b that is provided to be capable of pressing the friction members 33 when in contact with the friction members 33. The contact pressing portion 34b is provided between the attachment portion 32c of the tubular connecting member 32 and the friction members 33 in the axial direction so as to overlap these components from the axial direction. Further, as shown in FIG. 5, the piston 34 includes a projecting portion 34c projecting to the axial first direction A1 side. The projecting portion 34c is formed integrally with the piston 34 and has an arc-shaped cross-section. In this embodiment, the projecting portion 34c is formed in a connecting portion between the tubular extending portion 34a and the contact pressing portion 34b of the piston 34 in a position that partially overlaps the tubular extending portion 34a when viewed from the axial direction.

Seal members such as O rings are disposed respectively between the tubular extending portion 32d of the tubular connecting member 32 and the tubular extending portion 34a of the piston 34 and between the tubular projecting portion 32e and a radial direction inner side end portion of the piston 34. As a result, the working oil pressure chamber H1 is formed as an airtight space defined by the radial direction extending portion 32b, the tubular extending portion 32d, the tubular projecting portion 32e, and the piston 34. In this example in particular, the working oil pressure chamber H1 is formed between the radial direction extending portion 32b and a site of the piston 34 on the radial direction inner side of the tubular extending portion 34a. In this embodiment, the working oil pressure chamber H1 is formed on the radial direction inner side of the friction members 33 in a position that partially overlaps the friction members 33. As shown in FIG. 4, working oil is supplied from the piston 34 to the working oil pressure chamber H1 through the first oil passage L1.

As shown in FIG. 5, a plate spring 35 is disposed on the working oil pressure chamber H1 side (the axial first direction A1 side) of the piston 34. In this embodiment, the plate spring 35 is disposed on the exterior of the working oil pressure chamber H1. The plate spring 35 is formed in an overall annular shape, and a radial direction inner side end portion thereof is positioned on the axial second direction A2 side of a radial direction outer side end portion. Further, the plate spring 35 is formed to have flat side faces and a plate-shaped cross-section. The plate spring 35 biases the piston 34 in the axial second direction A2, i.e. the pressing direction, regardless of the working oil pressure supplied to the working oil pressure chamber H1. In other words, in this example, the plate spring 35 is disposed between the radial direction extending portion 32b of the tubular connecting member 32 and the piston 34, and biases the piston 34 in the axial second direction A2 in a state where a reactive force thereof is supported by the radial direction extending portion 32b disposed on the axial first direction A1 side. Hence, even when no oil pressure is supplied to the working oil pressure chamber H1, the plate spring 35 biases the piston 34 in the axial second direction A2. In this embodiment, the plate spring 35 corresponds to a "biasing spring" of the present invention.

In this embodiment, the plate spring 35 is disposed on the radial direction outer side of the working oil pressure chamber H1. The plate spring 35 is disposed on the radial direction inner side of the axial direction extending portion 32a and the radial direction outer side of the working oil pressure chamber H1. Further, in this example, the plate spring 35 is disposed in a position deviating to the axial first direction A1 side of the working oil pressure chamber H1 between the attachment portion 32c formed integrally with the radial direction extending portion 32b and the contact pressing portion 34b of the piston 34. More specifically, as shown in FIG. 5, a step portion 32h is formed on a surface of the attachment portion 32c on the axial second direction A2 side, which serves as a friction opposing surface 32g opposing the friction members 33. In this example, the step portion 32h is formed on an angle portion of a radial direction inner side end portion of the attachment portion 32c so as to be slightly indented toward the axial first direction A1 side from the friction opposing surface 32g.

In this embodiment, the plate spring 35 is disposed in contact with the step portion 32h. Here, a tubular inner peripheral surface extending in the axial direction and the circumferential direction continuously from the friction opposing surface 32g and a radial direction extending surface extending in the radial direction and the circumferential direction continuously from this tubular inner peripheral surface will be referred to collectively as the "step portion 32h" formed on the friction opposing surface 32g. Note that in the illustrated example, a radial direction inner side part of the radial direction extending surface is formed in a stepped shape that projects slightly toward the axial second direction A2 side. In this example, the plate spring 35 is disposed such that the radial direction outer side end portion thereof contacts the step portion 32h. More specifically, the plate spring 35 is disposed such that the radial direction outer side end portion thereof contacts the tubular inner peripheral surface and a radial direction inner side part of the radial direction extending surface. Further, the plate spring 35 is disposed to contact the projecting portion 34c of the piston 34. In this example, the plate spring 35 is disposed such that a side face of the radial direction inner side end portion thereof on the axial second direction A2 side contacts the projecting portion 34c.

Further, as shown in FIG. 3, the circulation oil pressure chamber H2 is formed on an opposite side (here, the axial second direction A2 side) of the piston 34 to the working oil pressure chamber H1. The circulation oil pressure chamber H2 is formed as a space defined mainly by the piston 34, the axial direction extending portion 32a, the cover portion 42 of the torque converter TC, the tubular projecting portion 11, the input shaft 1, and the clutch hub 31. In this embodiment, seal members respectively seal between the tubular projecting portion 11 and the input shaft I and between the axial direction extending portion 32a and the cover portion 42. As a result, the circulation oil pressure chamber H2 is formed as an airtight space. An oil pressure discharged by the oil pump 9 and regulated to a predetermined oil pressure level by an oil pressure control device (not shown) is supplied to the circulation oil pressure chamber H2 through the second oil passage L2. Further, the oil in the circulation oil pressure chamber H2 is discharged from the third oil passage L3 via a connecting oil passage formed inside the input shaft I.

2-4. Torque Converter

As shown in FIG. 2, the torque converter TC is disposed on the axial second direction A2 side of the rotating electrical machine MG and the input clutch C1 and on the axial first direction A1 side of the intermediate support wall 6 and the speed change mechanism TM. The torque converter TC includes the pump impeller 41, the turbine runner 45, the stator 48, and the cover portion 42 housing these components.

The cover portion 42 is constituted to rotate integrally with the pump impeller 41. Here, the pump impeller 41 is provided integrally on an inner side of the cover portion 42. Further, the cover portion 42 is coupled to the tubular connecting member 32. The cover portion 42 is drive-coupled to the rotor Ro of the rotating electrical machine MG so as to rotate integrally therewith via the tubular connecting portion 32 and the rotor supporting member 22. Hence, the integrally rotating pump impeller 41 and cover portion 42 together constitute an input side rotary member (joint input side member) of the torque converter TC to which the rotation and torque of one or both of the internal combustion engine E and the rotating electrical machine MG are transmitted. Further, the cover portion 42 is coupled to the pump drive shaft 43. The cover portion 42 is drive-coupled to the pump rotor of the oil pump 9 so as to rotate integrally therewith via the pump drive shaft 43.

The turbine runner 45 is disposed on the axial first direction A1 side of the pump impeller 41 so as to face the pump impeller 41. The turbine runner 45 forms a pair with the pump impeller 41 to constitute an output side rotary member (joint output side member) of the torque converter TC for transmitting to the intermediate shaft M on the output shaft O side the rotation and torque input into the pump impeller 41. The turbine runner 45 includes a radial direction extending portion 46 extending in the radial direction. In this embodiment, the radial direction extending portion 46 is spline-coupled to the intermediate shaft M, which is disposed so as to penetrate the radial direction extending portion 46. Further, the stator 48 is disposed between the pump impeller 41 and the turbine runner 45 in the axial direction. The stator 48 is supported on the intermediate support wall 6 via a one way clutch 49 and a fixed shaft.

In this embodiment, a main body portion of the torque converter TC is constituted by the pump impeller 41 and the turbine runner 45 disposed opposite each other. The cover portion 42 that holds the pump impeller 41 from the outer side is disposed so that the turbine runner 45 is also housed therein. In other words, the cover portion 42 is disposed to house the main body portion of the torque converter TC. Furthermore, in this embodiment, the lockup clutch C2 and so on disposed on the axial first direction A1 side relative to the main body portion of the torque converter TC are also housed in the cover portion 42.

2-5. Power Transmission Member

The power transmission member T is a member for transmitting the power (torque) of the rotating electrical machine MG to the speed change mechanism TM on the vehicle wheel W side. In this embodiment, when the rotation and torque of the rotating electrical machine MG are transmitted to the pump impeller 41 of the torque converter TC, the rotation and torque are transmitted to the speed change mechanism TM via the torque converter TC. For this purpose, the power transmission member T is coupled to the rotor supporting member 22 of the rotating electrical machine MG and the pump impeller 41 so as to rotate integrally therewith. The power transmission member T according to this embodiment is formed by integrally coupling the tubular connecting member 32 serving as the output side rotary member of the input clutch C1 and the cover portion 42 of the torque converter TC. Note that when the input clutch C1 is engaged, the power transmission member T is capable of transmitting to the vehicle wheel W side the power (torque) of both the internal combustion engine E and the rotating electrical machine MG.

As shown in FIG. 3, the rotor supporting member 22 and the power transmission member T are coupled by a first fixed fastening portion F1. The first fixed fastening portion F1 is a site for fixedly fastening the rotor supporting member 22 to the tubular connecting member 32. In this embodiment, the radial direction extending portion 24 of the rotor supporting member 22 and the attachment portion 32c of the tubular connecting member 32 are disposed to contact each other in the axial direction. In this example, the attachment portion 32c is disposed to contact the radial direction extending portion 24 from the axial second direction A2 side. These components are disposed such that respective axial centers of the plurality of first bolt insertion holes 24a provided in the radial direction extending portion 24 are perfectly aligned with axial centers of the plurality of first bolt fastening holes provided in the attachment portion 32c. The first bolts 71 are inserted into the respective first bolt insertion holes 24a and fastened to the first bolt fastening holes. As a result, the radial direction extending portion 24 and the attachment portion 32c are fastened to each other fixedly by the first bolts 71, and thus the first fixed fastening portion F1 is formed by the fastening site between the radial direction extending portion 24 and the attachment portion 32c. In this embodiment, the first fixed fastening portion F1 corresponds to a "fixed fastening portion" of the present invention. Note that in this example, the first bolts 71, first bolt insertion holes 24a, and first bolt fastening holes are distributed in the circumferential direction to form a plurality of groups disposed at equal circumferential direction position intervals. Therefore, the "first fixed fastening portion F1" is used as an inclusive term for this plurality of groups.

Note that in this embodiment, the outer peripheral surface of the supporting cylindrical portion 25 and the inner peripheral surface of the tubular extending portion 32d are fitted to each other so as to contact each other over the entirety of the circumferential direction. This determines mutual positioning between the rotor supporting member 22 and tubular connecting member 32 in the radial direction.

The tubular connecting member 32 and the cover portion 42 constituting the power transmission member T are coupled by a second fixed fastening portion F2. The second fixed fastening portion F2 is a site for fixedly fastening the tubular connecting member 32 to the cover portion 42. In this embodiment, the radial direction extending portion 32f of the tubular connecting member 32 and a site of the cover portion 42 that extends in the radial direction are fastened to each other fixedly by a second bolt 72. Thus, the second fixed fastening portion F2 is formed by the fastening site between the radial direction extending portion 32f and the cover portion 42.

As shown in FIG. 2 and so on, on the axial first direction A1 side, the integrally rotating rotor supporting member 22 and power transmission member T (in other words, the integrally rotating rotor supporting member 22, tubular connecting member 32, and cover portion 42) are supported in the radial direction on an outer peripheral surface of the tubular projecting portion 11 formed integrally with the end portion support wall 5 to be capable of rotating via the first bearing 61. A bearing capable of receiving a comparatively large radial direction load is used as the first bearing 61, and in this example, a ball bearing is used. Meanwhile, on the axial second direction A2 side, the integrally rotating rotor supporting member 22 and power transmission member T are supported in the radial direction on an inner peripheral surface of a through hole in the intermediate support wall 6 to be capable of rotating via a second bearing 62. A bearing capable of receiving a radial direction load is used as the second bearing 62, and in this example a needle bearing is used.

Further, the input shaft I disposed to penetrate the tubular projecting portion 11 of the end portion support wall 5 is supported in the radial direction on the inner peripheral surface of the tubular projecting portion 11 to be capable of rotating via a third bearing 63. A bearing capable of receiving a radial direction load is used as the third bearing 63, and in this example a needle bearing is used. In this embodiment, the input shaft I is supported on the inner peripheral surface of the tubular projecting portion 11 via two third bearings 63 disposed along the inner peripheral surface of the tubular projecting portion 11 at intervals of a predetermined distance in the axial direction.

3. Torque Transmission in Input Clutch C1

Next, torque transmission in the input clutch C1 according to this embodiment will be described. Here, description will be divided into a pump stoppage period, which is a state where the oil pump 9 is halted, and a pump driving period, which is a state where the oil pump 9 is driven by one or both the internal combustion engine E and the rotating electrical machine MG serving as drive power sources.

3-1. Pump Stoppage Period

When both the internal combustion engine E and the rotating electrical machine MG are stopped, the oil pump 9 is also stopped, and therefore no oil is discharged from the oil pump 9. In this state, the oil pressure supplied to both the working oil pressure chamber H1 and the circulation oil pressure chamber H2 of the input clutch C1 is substantially zero. Accordingly, substantially no oil pressure acts on the piston 34 from either axial direction side. In this embodiment, however, as shown in FIG. 3, the plate spring 35 is disposed between the radial direction extending portion 32b (the attachment portion 32e) of the tubular connecting member 32 and the piston 34, as described above, and the plate spring 35 biases the piston 34 in the axial second direction A2. Therefore, even when the oil pump 9 is stopped, the piston 34 can frictionally engage the plurality of friction members 33 with each other at a predetermined engagement pressure using the biasing force of the plate spring 35. Hence, even when the oil pump 9 is stopped such that no oil is supplied to the working oil pressure chamber H1 and the circulation oil pressure chamber H2, the input clutch C1 can transmit torque between the input shaft I and the power transmission member T using the biasing force of the plate spring 35. In other words, the input clutch C1 according to this embodiment is a type of so-called normally closed friction engagement device.

In this embodiment, as shown in FIG. 5, the plate spring 35 is disposed such that the radial direction outer side end portion thereof contacts the step portion 32h provided on the attachment portion 32c and the side face of the radial direction inner side end portion thereof on the axial second direction A2 side contacts the projecting portion 34c of the piston 34. Hence, in this embodiment, the plate spring 35 is disposed to contact a part of the thickly formed attachment portion 32c, and therefore one end of the plate spring 35 (in this example, the radial direction outer side end portion) can be supported with stability by the attachment portion 32c. At this time, the plate spring 35 can be supported with stability using the attachment portion 32c, which is a site for fastening the rotor supporting member 22 of the rotating electrical machine MG to the tubular connecting member 32 fixedly using the first bolts 71, and therefore a special component or the like need not be provided additionally. Furthermore, in this embodiment, the plate spring 35 is disposed in contact with the step portion 32h formed on the friction opposing surface 32g of the attachment portion 32c, and therefore the plate spring 35 formed in an overall annular shape can be positioned appropriately in the radial direction.

Further, in this embodiment, the side face of the radial direction inner side end portion of the plate spring 35 on the axial second direction A2 side is disposed in contact with the projecting portion 34c formed on the piston 34 with an arc-shaped cross-section, and therefore the piston 34 can be pressed smoothly regardless of displacement in a contact portion between the plate spring 35 and the piston 34 accompanying elastic deformation of the plate spring 35 or axial direction movement of the piston 34 caused by an action of the oil pressure supplied to the working oil pressure chamber H1. Furthermore, in this embodiment, the projecting portion 34c is formed in an equal radial direction position to the tubular extending portion 34a of the piston 34 on the radial direction outer side of the working oil pressure chamber H1, and therefore the biasing force of the plate spring 35 can be exerted on the piston 34 in a closer radial direction position to the contact pressing portion 34b. As a result, the biasing force of the plate spring 35 can be exerted efficiently on the friction members 33 disposed on the radial direction outer side of the working oil pressure chamber H1.

In this embodiment, the magnitude of the biasing force of the plate spring 35 is set in advance to remain within a predetermined range when no oil is supplied to either the working oil pressure chamber H1 or the circulation oil pressure chamber H2 of the input clutch C1. Here, the "predetermined range" is a range extending from a first limit threshold T1 up to and including a second limit threshold T2, as will be described below. The first limit threshold T1 is a lower limit value of a biasing force (a load) at which the torque of the internal combustion engine E can be transmitted to the oil pump 9 via the input clutch C1 to drive the oil pump 9 from the stopped state in a state where no oil is supplied to either the working oil pressure chamber H1 or the circulation oil pressure chamber H2. Further, the second limit threshold T2 is an upper limit value of a biasing force (a load) at which the stopped internal combustion engine E can be maintained in the stopped state even when the torque of the rotating electrical machine MG is transmitted to the internal combustion engine E via the input clutch C1 in a state where no oil is supplied to either the working oil pressure chamber H1 or the circulation oil pressure chamber H2.

In this embodiment, the magnitude of the biasing force of the plate spring 35 is set as described above, and therefore not only the torque of the rotating electrical machine MG but also the torque of the internal combustion engine E can be transmitted to the oil pump 9. Hence, the oil pump 9 can be driven using the torque of the internal combustion engine E to obtain a predetermined oil pressure for engaging the input clutch C1. Therefore, when a fault or the like occurs in the rotating electrical machine MG, for example, the vehicle can be caused to travel appropriately using the torque of the internal combustion engine E. Further, even if a part of the torque of the rotating electrical machine MG is transmitted to the internal combustion engine E by the biasing force of the plate spring 35 when torque is output by the rotating electrical machine MG during a normal operation of the rotating electrical machine MG, the internal combustion engine E can basically be maintained in the stopped state.

3-2. Pump Driving Period

When at least one of the internal combustion engine E and the rotating electrical machine MG is driven, the oil pump 9 is also driven, and therefore the oil pump 9 discharges oil. In this state, the oil pressures supplied respectively to the working oil pressure chamber H1 and the circulation oil pressure chamber H2 of the input clutch C1 can be controlled to predetermined magnitudes via the oil pressure control device (not shown). In this example, the oil pressure supplied to the circulation oil pressure chamber H2 is maintained at a substantially constant magnitude (to be referred to hereafter as a "circulation pressure Pc") basically regardless of conditions, while the oil pressure supplied to the working oil pressure chamber H1 is controlled to a desired magnitude corresponding to conditions on the basis of a command value or the like from a control unit (not shown). More specifically, the oil pressure supplied to the working oil pressure chamber H1 is controlled such that the supplied oil pressure is zero normally but shifts to a predetermined full engagement pressure (a pressure at which the input clutch C1 reaches a steady direct engagement state regardless of variation in the torque transmitted to the input clutch C1) as necessary.

In a state where the oil pressure supplied to the working oil pressure chamber H1 remains at zero and the oil pressure supplied to the circulation oil pressure chamber H2 is at the circulation pressure Pc during vehicle travel, for example, the circulation pressure Pc is exerted on the piston 34 from the axial second direction A2 side. As a result, the biasing force of the plate spring 35 disposed to press the plurality of friction members 33 against each other at the predetermined engagement pressure can be canceled out by the circulation pressure Pc supplied to the circulation oil pressure chamber H2, As a result, the input clutch C1 can be disengaged. Hence, once the sufficient circulation pressure Pc has been obtained following startup of the vehicle, for example, the vehicle can be caused to travel in a so-called electric travel mode, i.e. using only the torque of the rotating electrical machine MG in a state where the input clutch C1 is disengaged such that drag in the internal combustion engine E is suppressed. In another favorable constitution, a preparatory operation performed by a driver to start the vehicle is detected, and on the basis of the detection result, the input clutch C1 is disengaged prior to vehicle startup by driving the oil pump 9 using the torque of the rotating electrical machine MG. Thus, the vehicle can actually be started while the input clutch C1 is disengaged.

When the oil pressure supplied to the working oil pressure chamber H1 increases beyond a predetermined pressure during vehicle travel, for example, the circulation pressure Pc exerted on the piston 34 from the axial second direction A2 side may be canceled out by the oil pressure supplied to the working oil pressure chamber H1 such that the piston 34 is pushed further to the axial second direction A2 side, thereby pressing the plurality of friction members 33 against each other. As a result, the input clutch C1 can be engaged. Hence, under conditions where the drive power required to cause the vehicle to travel is extremely large, for example when traveling uphill, the input clutch C1 can be engaged so that the torque of the internal combustion engine E can be transmitted to the vehicle wheels W, and as a result, the vehicle can be caused to travel appropriately in a so-called parallel travel mode, i.e. using the torque of both the internal combustion engine E and the rotating electrical machine MG Note that when a mode switch is performed from the electric travel mode to the parallel travel mode, internal combustion engine start control is executed to crank the internal combustion engine E using the torque of the rotating electrical machine MG, which is transmitted via the input clutch C1. During this internal combustion engine start control, the internal combustion engine E is started quickly at a desired timing, and therefore a high level of control responsiveness is required with respect to engagement and disengagement of the input clutch C1.

If the plate spring 35 is disposed inside the working oil pressure chamber H1, the volume of the working oil pressure chamber H1 must be increased by an amount corresponding to an axial direction length of a region occupied by the plate spring 35. When the volume of the working oil pressure chamber H1 increases, the time required to fill the working oil pressure chamber H1 with oil increases correspondingly, leading to a reduction in responsiveness with respect to engagement and disengagement of the input clutch C1. In this embodiment, however, the plate spring 35 is disposed on the exterior of the working oil pressure chamber H1 rather than inside the working oil pressure chamber H1, and therefore the volume of the working oil pressure chamber H1 can be determined without taking into account the existence of the plate spring 35. In other words, the volume of the working oil pressure chamber H1 does not have to be enlarged even when the plate spring 35 is provided to bias the piston 34 in the axial second direction A2, i.e. the pressing direction. Hence, with the driving apparatus 1 according to this embodiment, a favorable degree of responsiveness can be maintained with respect to engagement and disengagement of the input clutch C1.

4. Other Embodiments

Finally, other embodiments of the vehicle driving apparatus according to the present invention will be described. Note that the respective constitutions of the embodiments to be described below are not limited to application in the form of the corresponding embodiment, and as long as contradictions do not arise, these constitutions may be applied in combination with constitutions of other embodiments.

(1) In the above embodiment, a case in which the plate spring 35 is disposed to contact the step portion 32h, which is formed on the friction opposing surface 32g of the attachment portion 32c so as to be indented toward the axial first direction A1 side relative to the friction opposing surface 32g, was described as an example. However, the present invention is not limited to this embodiment, and in another embodiment of the present invention, for example, a projecting portion that projects to the axial second direction A2 side may be formed on the friction opposing surface 32g of the attachment portion 32c, and the plate spring 35 may be disposed to contact this projecting portion and the friction opposing surface 32g. In this case, the plate spring 35 is positioned in the radial direction by the projecting portion. In another embodiment of the present invention, the projecting portion may not be provided, and instead, the plate spring 35 may be disposed in contact with the axial direction extending portion 32a and the friction opposing surface 32g. In this case, the plate spring 35 is positioned in the radial direction by the axial direction extending portion 32a.

(2) In the above embodiment, a case in which the plate spring 35 is disposed to contact the attachment portion 32c, which is formed integrally with the axial direction extending portion 32a and the radial direction extending portion 32b as a thick portion having a predetermined thickness in the axial direction and the radial direction, was described as an example. However, the present invention is not limited to this embodiment, and in another embodiment of the present invention, the thick attachment portion 32c may be omitted, and instead, the plate spring 35 may be disposed to contact a side face of the radial direction extending portion 32b formed in a substantially flat plate shape, for example. In this case, the first fixed fastening portion F1 between the rotor supporting member 22 and the tubular connecting member 32 may be formed as a joint site by welding, for example.

(3) In the above embodiment, a case in which the plate spring 35 is disposed in contact with the projecting portion 34c, which is formed integrally with the piston 34 and has an arc-shaped cross-section so as to project to the axial first direction A1 side from the piston 34, was described as an example. However, the present invention is not limited to this embodiment, and in another embodiment of the present invention, the plate spring 35 may be disposed to contact the projecting portion 34c of the piston 34 formed with an arbitrary cross-sectional shape. In another embodiment of the present invention, the projecting portion 34c may be omitted, and instead, the plate spring 35 may be disposed to contact a substantially flat side surface of the piston 34 (for example, a connecting portion between the tubular extending portion 34a and the contact pressing portion 34b) on the axial first direction A1 side. In a further another embodiment of the present invention, the plate spring 35 may be disposed in contact with a recessed portion having an arbitrary cross-sectional shape, which is indented to the axial second direction A2 side from the substantially flat side surface of the piston 34 on the axial first direction A1 side.

(4) In the above embodiment, a case in which the plate spring 35, which is formed with an overall annular shape, is disposed such that the radial direction inner side end portion thereof is positioned on the axial second direction A2 side of the radial direction outer side end portion was described as an example. However, the present invention is not limited to this embodiment, and in another embodiment of the present invention, the plate spring 35 may be disposed such that the radial direction outer side end portion is positioned on the axial second direction A2 side of the radial direction inner side end portion. In this case, the shapes of the radial direction extending portion 32b (including the attachment portion 32c) and the piston 34 may be set in accordance with the arrangement of the plate spring 35.

(5) In the above embodiment, a case in which the input clutch C1 includes the plate spring 35 in order to bias the piston 34 in the axial second direction A2, i.e. the pressing direction, when no oil is supplied to the working oil pressure chamber H1 was described as an example. However, the present invention is not limited to this embodiment, and in another embodiment of the present invention, the input clutch C1 may include another biasing spring such as a coil spring, for example, as long as the spring provides a similar function to the plate spring 35 of the above embodiment.

(6) In the above embodiment, a case in which the clutch hub 31 is drive-coupled to the input shaft I so as to rotate integrally therewith, the tubular connecting member 32 constituting the power transmission member T functions as a clutch drum that forms a pair with the clutch hub 31, and the working oil pressure chamber H1 is formed between the tubular connecting member 32 and the piston 34 was described as an example. However, the present invention is not limited to this embodiment, and in another embodiment of the present invention, for example, a clutch drum may be drive-coupled to the input shaft I so as to rotate integrally therewith, a clutch hub that forms a pair with the clutch drum may be drive-coupled to the rotating electrical machine MG or the like so as to rotate integrally therewith, and the working oil pressure chamber H1 may be formed between the clutch drum (corresponding to the "engagement input side member") that rotates integrally with the input shaft I and the piston 34.

(7) In the above embodiment, a case in which the torque converter TC including the pump impeller 41, the turbine runner 45, and the stator 48 is provided in the driving apparatus 1 as a fluid coupling was described as an example. However, the present invention is not limited to this embodiment, and in another embodiment of the present invention, for example, the stator 48 may be omitted, and instead, a fluid coupling having only the pump impeller 41 and the turbine runner 45 may be provided in the driving apparatus 1 as the fluid coupling. In a further another embodiment of the present invention, this type of fluid coupling may not be provided in the driving apparatus 1.

(8) In the above embodiment, a case in which the driving apparatus 1 has a single shaft structure suitable for installation in an FR (front-engine, rear-wheel drive) vehicle was described as an example. However, the present invention is not limited to this embodiment, and in another embodiment of the present invention, the driving apparatus 1 may be a multi-shaft driving apparatus that includes a counter gear mechanism or the like, for example, in which an axle is disposed on a different axis to the axis center X shared by the input shaft I and the intermediate shaft M. A driving apparatus having this structure is suitable for installation in an FF (front-engine, front-wheel drive) vehicle.

(9) As regards other constitutions, the embodiment disclosed in this specification is, on all points, merely an example, and the present invention is not limited to this embodiment. In other words, as long as the constitutions described in the claims and their equivalents are provided, constitutions in which component structures that are not described in the claims are partially modified where appropriate may of course fall within the technical scope of the present invention.

The present invention can be used favorably as a vehicle driving apparatus in which a rotating electrical machine and an engagement device are disposed on a power transmission path linking an input member drive-coupled to an internal combustion engine and an output member drive-coupled to a vehicle wheel.

The invention claimed is:
1. A vehicle driving apparatus, comprising:
a rotating electrical machine; and
an engagement device, wherein
  the rotating electrical machine and the engagement device are disposed on a power transmission path linking an input member drive-coupled to an internal combustion engine and an output member drive-coupled to a vehicle wheel,
  the engagement device includes an engagement input side member coupled to the input member, an engagement output side member that forms a pair with the engagement input side member and is coupled to the rotating electrical machine, a friction member disposed between the engagement input side member and the engagement output side member, and a pressing member that presses the friction member in a pressing direction,
  a working oil pressure chamber that is supplied with a working oil pressure for pressing the pressing member in the pressing direction is formed between the pressing member and either the engagement input side member or the engagement output side member,
  a biasing spring that biases the pressing member in the pressing direction when no working oil pressure is supplied to the working oil pressure chamber is disposed on an exterior of the working oil pressure chamber,
  the engagement output side member includes an axial direction extending portion that extends in an axial direction to cover at least a radial direction outer side of the friction member, and a radial direction extending portion that extends in a radial direction to an anti-pressing direction side that is in an opposite direction to the pressing direction relative to the friction member,
  the working oil pressure chamber is formed on a radial direction inner side of the friction member,
  the pressing member is provided to press the friction member from the radial direction extending portion side,
  the biasing spring is disposed between the radial direction extending portion and the pressing member on a radial direction inner side of the axial direction extending portion and a radial direction outer side of the working oil pressure chamber, and the pressing member includes a contact portion that is pressed by the biasing spring, the contact portion being disposed at a radial position outside of the radially outermost portion of the working oil pressure chamber.

2. The vehicle driving apparatus according to claim 1, wherein the engagement output side member includes a fastening attachment portion formed thickly to bolt a rotor member of the rotating electrical machine formed integrally with the radial direction extending portion, and the biasing spring is disposed to contact a step portion formed on a surface of the fastening attachment portion facing the pressing direction side.

3. The vehicle driving apparatus according to claim 2, wherein the contact portion is a projecting portion having an arc-shaped cross-section, which projects to the anti-pressing direction side that is in the opposite direction to the pressing direction, and the biasing spring is disposed to contact the projecting portion.

4. The vehicle driving apparatus according to claim 1, wherein the contact portion is a projecting portion having an arc-shaped cross-section, which projects to the anti-pressing direction side that is in the opposite direction to the pressing direction, and the biasing spring is disposed to contact the projecting portion.

* * * * *